(No Model.)

F. H. ELDRIDGE.
HANDLE.

No. 414,690. Patented Nov. 12, 1889.

WITNESSES:
Chas. A. Rutter.
Saml. P. Hanson

INVENTOR
F. Howard Eldridge

UNITED STATES PATENT OFFICE.

FRANCIS HOWARD ELDRIDGE, OF PHILADELPHIA, PENNSYLVANIA.

HANDLE.

SPECIFICATION forming part of Letters Patent No. 414,690, dated November 12, 1889.

Application filed September 8, 1886. Serial No. 212,936. (No model.)

*To all whom it may concern:*

Be it known that I, FRANCIS HOWARD ELDRIDGE, a citizen of the United States, residing at Philadelphia, in the county of Philadelphia and State of Pennsylvania, have invented a new and useful Improvement in Handles, of which the following is a specification.

My invention relates to the construction of handles for such utensils as are in two sections, each of which requires a handle when open or apart, which two handles, when the sections are closed or connected, become practically one handle; and it consists in constructing such handles of a material light and cheap and of a form at once convenient and substantial.

Figure 1:
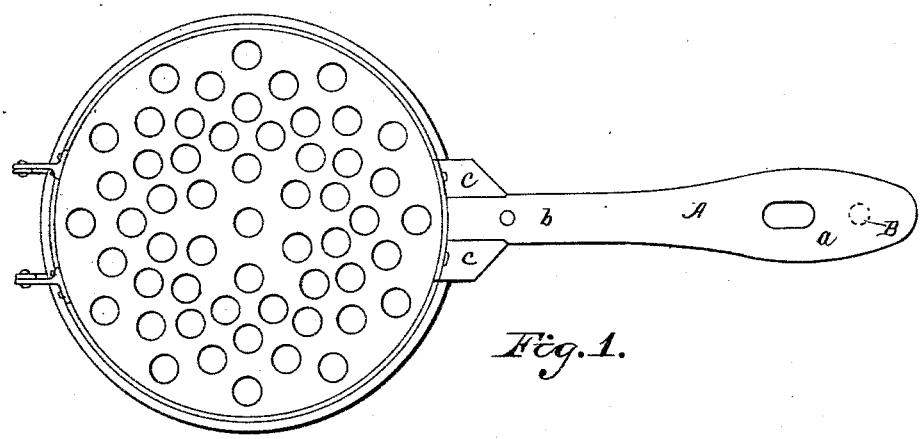
Figure 2:
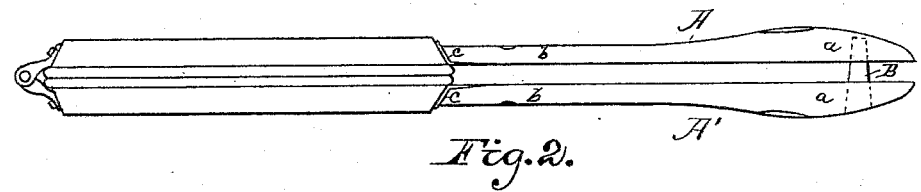
Figure 3:
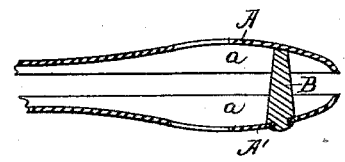

Referring to the accompanying drawings, Figure 1 is a top view of a broiler to which my handle is attached. Fig. 2 is a side view of the same. Fig. 3 is a sectional view of the hand part of the handle.

A is a half-handle attached to one side of a utensil, (as shown in drawing a broiler,) and A' is a half-handle, similar except in one respect, hereinafter specified, attached to the other side. Each half-handle is struck out of sheet metal and is half-round or thereabout in cross-section, and is provided with lugs C C, by which it is fastened. With these two half-handles the article to which they are attached can be opened or closed, and when it is closed the two form practically one handle nearly or quite round and readily grasped.

When the handle is closed and grasped in the hand, the edges of the metal would be liable to pinch the hand but for the interposition of the pin B, which is attached to the inside of the hand part of one of the half-handles and abuts against the corresponding part of the other, preventing the two from coming into contact and guiding them into position.

I claim as my invention—

In combination with a utensil in two parts hinged together, two half-round stamped handles which when closed form one handle approximately round, one of said half-round handles having a pin which abuts against the other, whereby the two are kept from contact.

F. HOWARD ELDRIDGE.

Witnesses:
   SAML. P. HANSON,
   GEORGE HOUSE.